(12) United States Patent
Stewart et al.

(10) Patent No.: US 7,426,379 B1
(45) Date of Patent: Sep. 16, 2008

(54) METHOD AND SYSTEM FOR SOUND MITIGATION DURING INITIATION OF A PACKET-BASED REAL-TIME MEDIA SESSION

(75) Inventors: Tony A. Stewart, Shawnee Mission, KS (US); Clyde C. Heppner, Liberty, MO (US); Jesse M. Kates, Kansas City, MO (US); Robert R. Moritz, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1088 days.

(21) Appl. No.: 10/452,298

(22) Filed: Jun. 2, 2003

(51) Int. Cl.
 *H04M 9/00* (2006.01)
(52) U.S. Cl. .................. 455/401; 379/352; 455/519
(58) Field of Classification Search .......... 379/156, 379/164–165, 199, 352, 418; 455/401, 519
 See application file for complete search history.

(56) References Cited

U.S. PATENT DOCUMENTS

| | | | |
|---|---|---|---|
| 4,130,731 A * | 12/1978 | Bolgiano et al. ............ 455/403 |
| 4,669,110 A * | 5/1987 | Daie et al. ................. 379/165 |
| 4,870,408 A | 9/1989 | Zdunek et al. |
| 5,436,964 A * | 7/1995 | Halligan ..................... 379/257 |
| 5,442,809 A | 8/1995 | Diaz et al. |
| 5,563,938 A * | 10/1996 | Soshea et al. .......... 379/211.01 |
| 5,568,511 A | 10/1996 | Lampe |
| 5,710,591 A | 1/1998 | Bruno et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A * | 11/1999 | Yao et al. ................. 455/426.1 |
| 6,014,556 A | 1/2000 | Bhatia et al. |
| 6,032,051 A | 2/2000 | Hall et al. |
| 6,041,241 A | 3/2000 | Willey |
| 6,119,017 A | 9/2000 | Cassidy et al. |
| 6,178,323 B1 | 1/2001 | Nagata |
| 6,259,905 B1 * | 7/2001 | Berkowitz et al. .......... 455/401 |
| 6,381,467 B1 | 4/2002 | Hill et al. |
| 6,490,452 B1 | 12/2002 | Boscovic et al. |
| 6,526,377 B1 | 2/2003 | Bubb |

(Continued)

FOREIGN PATENT DOCUMENTS

EP 0 817 457 1/1998

(Continued)

OTHER PUBLICATIONS

International Search Report from International Application No. PCT/US02/31411, dated Mar. 4, 2003.

(Continued)

*Primary Examiner*—Fan Tsang
*Assistant Examiner*—Hemant S Patel

(57) ABSTRACT

A method and system for mitigating the impact of latency in the initiation of a packet-based real-time media session. When an initiating station is setting up a requested session, the initiating station will generate and play out a repetitive tone pattern (e.g., ring tone) for the initiating user to hear. The tone pattern is predefined in the initiating station, rather than being received from the network during session setup. The repetitive tone pattern preferably relaxes the initiating user and reduces or prevents "dead air" during session initiation.

18 Claims, 7 Drawing Sheets

U.S. PATENT DOCUMENTS

| | | | |
|---|---|---|---|
| 6,697,358 B2* | 2/2004 | Bernstein | 370/352 |
| 6,731,935 B2* | 5/2004 | Petrakos et al. | 455/434 |
| 7,050,564 B1* | 5/2006 | Boldt | 379/257 |
| 7,224,788 B1* | 5/2007 | Rhee et al. | 379/207.02 |
| 2002/0055364 A1 | 5/2002 | Wang et al. | |
| 2002/0071445 A1 | 6/2002 | Wu et al. | |
| 2002/0145990 A1 | 10/2002 | Sayeedi | |
| 2002/0147818 A1* | 10/2002 | Wengrovitz | 709/228 |
| 2002/0172165 A1 | 11/2002 | Rosen et al. | |
| 2002/0172169 A1 | 11/2002 | Rosen et al. | |
| 2002/0173325 A1 | 11/2002 | Rosen et al. | |
| 2002/0173326 A1* | 11/2002 | Rosen et al. | 455/518 |
| 2002/0173327 A1 | 11/2002 | Rosen et al. | |
| 2002/0177461 A1 | 11/2002 | Rosen et al. | |
| 2002/0191583 A1 | 12/2002 | Harris et al. | |
| 2003/0008657 A1 | 1/2003 | Rosen et al. | |
| 2003/0021264 A1 | 1/2003 | Zhakov et al. | |
| 2003/0114156 A1 | 6/2003 | Kinnavy | |
| 2004/0072593 A1* | 4/2004 | Robbins et al. | 455/560 |
| 2004/0121791 A1* | 6/2004 | May et al. | 455/519 |

FOREIGN PATENT DOCUMENTS

| | | |
|---|---|---|
| EP | 0 984 608 | 3/2000 |

OTHER PUBLICATIONS

International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct 22, 2002 entitled "Method for Call Setup Using Short Data Bursts".
3rd Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum Systesm, IS-2000-3, Jul. 12, 1999.
3rd Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
Oma, Discussion and definitions on PoC Floor Control, Input Contribution, Doc. #OMA-REQ-2003-0375-PoC_Floor_Control, Jun. 2, 2003.
Oma, "PoC Use case: Mobile—PC Example," Input Contribution, Doc #OMA-REQ-2003-0323 PoC Mobile-PC use case, May 5, 2003.
Oma, "PoC Use case: Multimedia Group Call Example," Input Contribution, Doc #OMA-REQ-2003-0306-PoC UseCase-group-multimedia-scenario, May 6, 2003.
Oma, "PoC Use case: Examples of User Requirements," Input Contribution, Doc #OMA-REQ-2003-0305-PoC Use Case, May 6, 2003.
Oma, "Inputs for PoC Requirements Document," Input Contribution, Doc #OMA-REQ-2003-0367-PoC_Input_Motorola, May 29, 2003.
Oma, "Push to Talk over Cellular (PoC)," Version: 0.1.6, May 12, 2003.
Office Action from Application No. 10/067,080, dated May 21, 2003.
Office Action from Application No. 10/067,080, dated Apr. 27, 2004.

* cited by examiner

METHOD AND SYSTEM FOR SOUND MITIGATION DURING INITIATION OF A PACKET-BASED REAL-TIME MEDIA SESSION

BACKGROUND

1. Field of the Invention

The present invention relates to network communications and, more particularly, to the establishment of packet-based real-time media sessions.

2. Description of Related Art a. Real-Time Media Conferencing

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). The server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request For Comments (RFC) 2543) and RTP (IETF RFC 1889) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate an PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well.

b. Setup Latency

Ideally, a wireless instant-connect system should simulate instant 2-way radio communication. For instance, when a user initiates a PTT session, the user will want to be able to press the PTT button and immediately begin talking to each other party "on the channel." Unfortunately, however, communications in the wireless environment can result in unacceptable call setup latencies on the order of 6 or even 10 seconds.

In general, this setup latency may arise at the initiating end and/or at the target end(s), because the initiating mobile station and/or target mobile station may need to acquire data connections (radio links and data links) before communication begins. Further, additional delay can arise as the communication server works to set up communication with the endpoints.

At the initiating end, for example, if the mobile station is dormant (having a data link but no radio link), the mobile station may need to request a radio link traffic channel before it can begin communicating with the communication server, and the process of requesting and waiting for a channel assignment can take some time. Further, once the initiating mobile station has acquired a radio link and thus switched from a dormant state to an active state, the mobile station may send an initiation request such as a SIP "INVITE" to the server, and it may then take some time for the server to set up an RTP leg with each participating station. Still further, if the initiating mobile station does not currently have a data-link layer connection when a user seeks to initiate a PTT session, additional delay may result as the mobile station works to establish that connection.

In turn, for each target mobile station, a radio access network may receive a termination request, such as an INVITE message, that is to be delivered to the target mobile station. If the target mobile station is dormant, the radio access network would then page the target station and await a response. This paging process can be a large source of call-setup latency if paging is carried out at only periodic time slots on the paging channel. Further, once a dormant mobile station receives a page, it may then respond to the page by requesting a traffic channel, which could add more delay. Still further, once the terminating mobile station has acquired a traffic channel, it may then need to work with the communication server to establish a conference leg, which could take still more time.

SUMMARY

The present invention mitigates the impact of setup latency by having an initiating station play out a repetitive tone pattern for the initiating user to hear during the setup period, without the initiating station receiving the repetitive tone pattern from any network entity during session initiation. Further, in an exemplary embodiment, the initiating station will then stop playing out the repetitive tone pattern when session setup is complete, such as when the complete session is established or when an initiating leg of the session is established.

By playing a repetitive tone pattern for the initiating user to hear during the setup period, the invention advantageously reduces or altogether avoids "dead air" during which the initiating user would otherwise wait for the requested session to be established. The invention can thereby reduce user frustration with setup latency and can therefore provide a better user experience.

Note that the invention markedly different than the operation of a traditional telephone system. In a traditional telephone system, when a telephone places a call, the telephone's serving switch sends an analog or digital representation of a ringing sound to the telephone, which the telephone plays out for the caller to hear. When the call is fully connected with the called party, the serving switch then stops sending the ringing sound to the telephone, and so the telephone necessarily stops playing out the ringing sound.

According to the present invention, however, the initiating station does not play out a ringing sound that it is receiving from a network entity. Rather, the initiating station itself generates a ringing sound (or other repetitive tone pattern), such as by executing program logic that defines the sound, or retrieving and playing a predefined tone pattern from memory. In turn, once the requested session is established in an exemplary embodiment, the initiating station stops generating the ringing sound, rather than a network entity stopping transmission of a ringing sound to the initiating station.

Advantageously, the present invention thus allows an initiating station to begin playing out a ringing sound to an initiating user before the initiating station even establishes a network connection. Thus, by way of example, an initiating station could respond to a user's session initiation request by immediately beginning to play a ringing sound for the user to hear, before the station even acquires a data connection through which to set up and/or conduct the session. By immediately beginning to play a ringing sound, the initiating station can give the user the impression that the station is simply waiting for the target station(s) to answer, which is an added benefit.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview of Packet-Based Real-Time Media Conferencing

Figure 1:
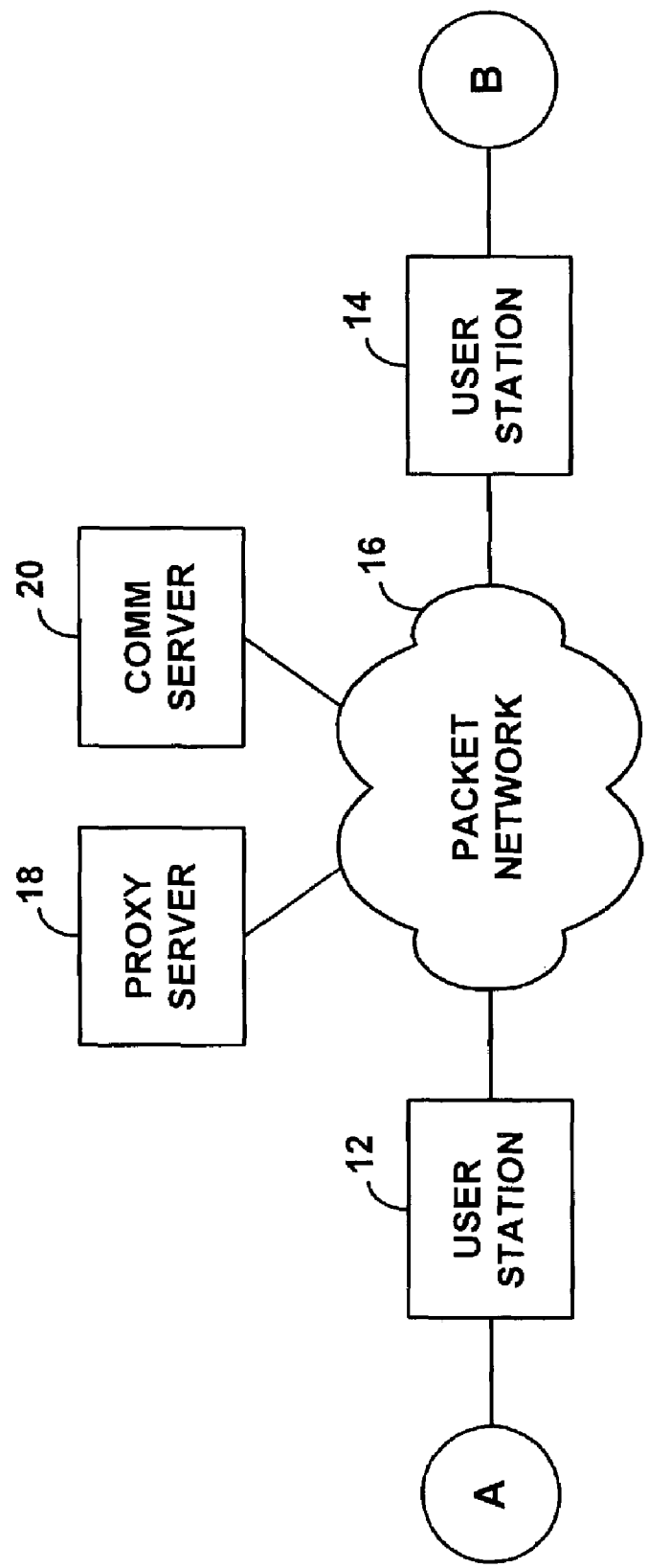
FIG. 1 is a block diagram of a communication system for carrying out packet-based real-time conferencing.

Referring to the drawings, FIG. 1 illustrates an exemplary communication system 10 arranged to provide packet-based real-time media conferencing. For simplicity, FIG. 1 depicts two user stations 12, 14, coupled with a common packet-switched network 16. User station 12 is operated by user A, and a user station 14 is operated by user B. Sitting on the packet network 16, by way of example, are then a proxy server 18 and a communication server 20.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the exemplary arrangement of FIG. 1, each user station 12, 14 is preferably equipped with hardware and logic to establish network connectivity and to set up and engage in packet-based real-time media sessions. To be able to establish network connectivity, for instance, each station may be equipped with a wireless or landline network interface module and logic to gain a data connection. To be able to set up a packet-based media session, each user station may then be programmed to engage in SIP signaling or other session initiation signaling. And to be able to communicate real-time media such as voice and/or video, each user station may be equipped with hardware to receive media from a user and to play out media to a user, as well as program logic to send and receive digital representations of the media according to RTP or another designated protocol.

Proxy server 18 may then be a signaling proxy that functions to forward or direct signaling messages from point to point through network 16. For instance, if SIP signaling is used, proxy server 18 could be a SIP proxy server.

Communication server 20, in turn, is also preferably equipped with hardware and logic to be able to set up media communications with each station and to bridge those communications together so as to allow users at the stations to communicate with each other. As such, communication server 20 may be programmed to engage in signaling communication according to SIP or another designated protocol, in order to set up a conference leg with each participating station. And communication server 20 may further be programmed to receive and send media streams according to RTP or another designated protocol.

Communication server 20 can be a discrete entity, such as an MCU. Alternatively, communication server 20 can comprise a number of components, such as (i) an MCU that bridges communications, and (ii) a controller that functions to set up and control conference legs through the MCU, using third party call control techniques, for instance. Other arrangements are also possible.

Figure 2:
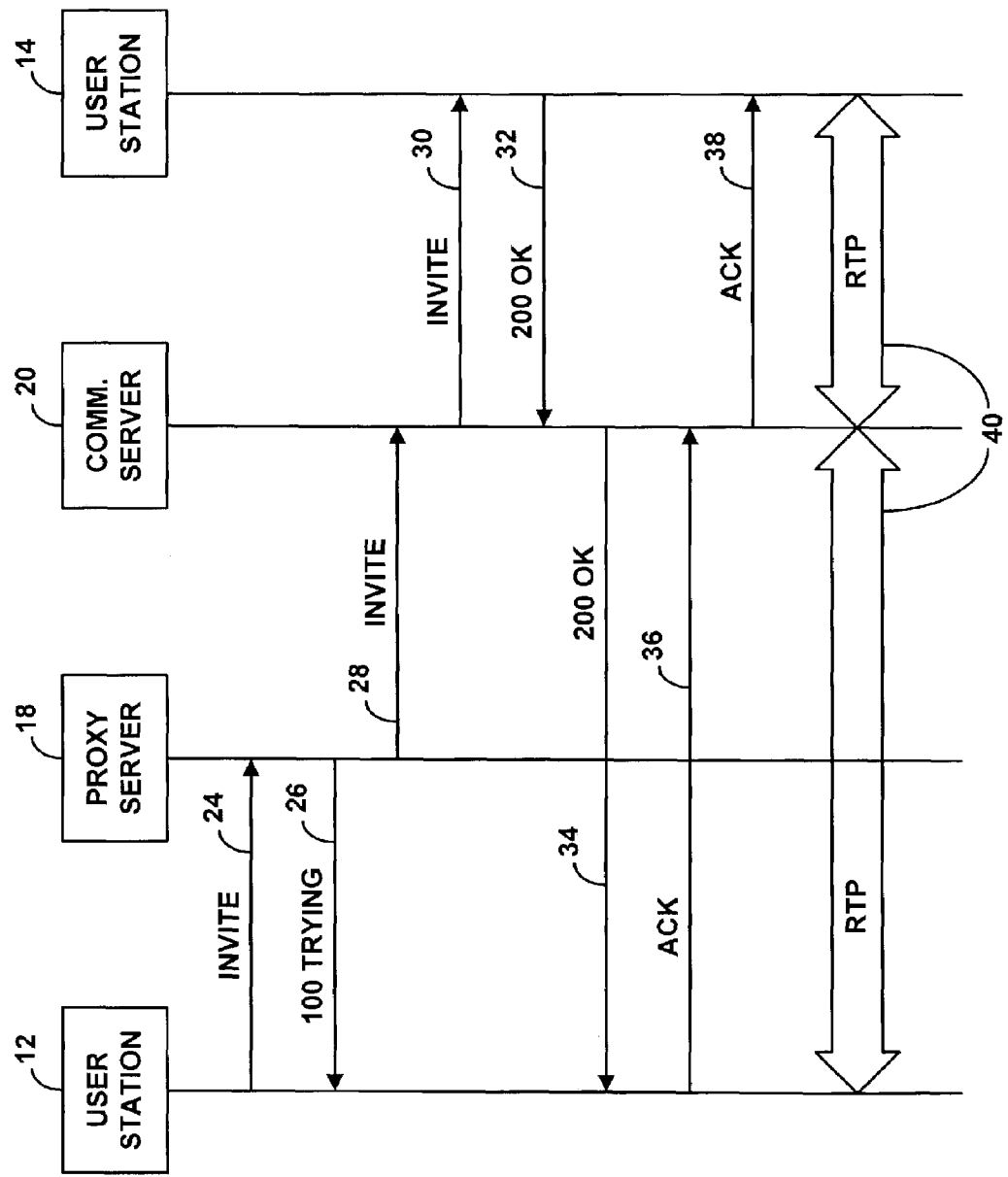
FIG. 2 is a message flow diagram showing an example of session setup signaling in the arrangement of FIG. 1.

FIG. 2 next depicts an exemplary method of setting up a packet-based real-time media conference session between users A and B in the arrangement of FIG. 1. As shown in FIG. 2, at step 24, in response to a request from user A to initiate a conference with user B, station 12 may initiate the conference by sending a SIP "INVITE" message to proxy server 18, destined to a predefined SIP address of communication server 20. The INVITE message may describe the type of session desired in accordance with the Session Description Protocol (SDP) and may designate user B as a target participant.

At step 26, after receiving the INVITE message, proxy server 18 then responds with a SIP "100 TRYING" message or other signal to acknowledge receipt of the INVITE message and to indicate that signaling is in process. Further, at step 28, proxy server 18 forwards the INVITE message to an IP address of the server 20 for handling.

Upon receipt of the INVITE message, at step 30, communication server 20 then sends an INVITE message to user B at user station 14, in an effort to set up a conference leg with user B. At step 32, upon receipt of the INVITE message, user station 14 responds with a SIP "200 OK" message indicating willingness to participate in the session. At step 34, communication server 20 then sends a 200 OK message to user station 12, similarly indicating willingness to participate in the session.

At step 36, user station 12 then responds to the communication server with a SIP "ACK" message, to complete set up of a conference leg between user station 12 and the server 20. And at step 38, the server similarly responds to user station 14 with an ACK message to complete set up of a conference leg between user station 14 and the server. At step 40, the server then engages in RTP communications with both user station 12 and user station 14 and bridges those communications together, so that users A and B can communicate with each other.

2. Example Instant-Connect System a. Network Architecture

Figure 3:
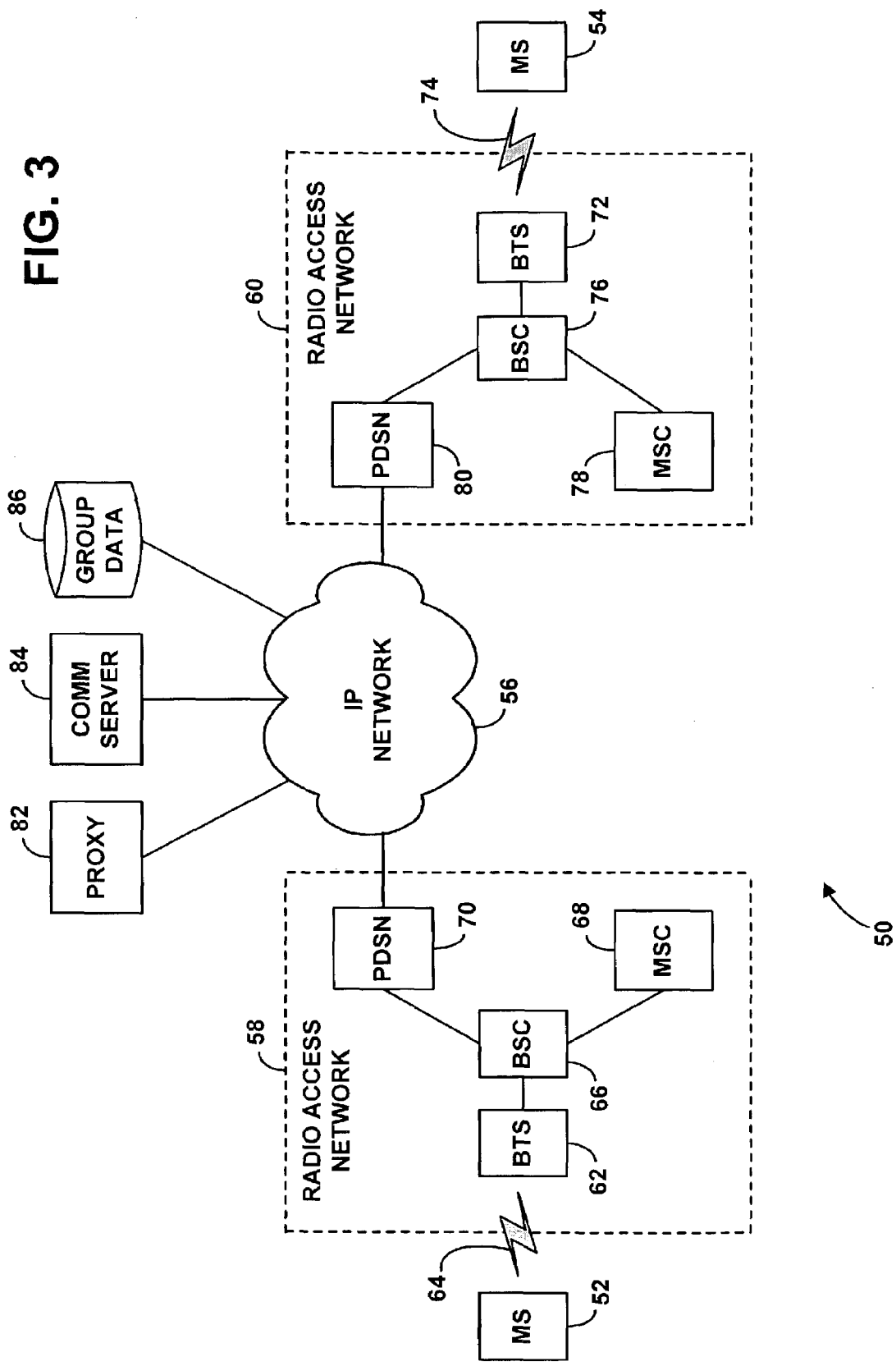
FIG. 3 is a block diagram of a wireless communication system in which an instant-connect service, such as push-to-talk, could be carried out.

As indicated above, real-time media conferencing such as that described in the preceding section can be employed to provide an instant-connect service, such as PTT service for instance. FIG. 3 illustrates an exemplary wireless communication system 50 in which such a service could be provided. It should be understood, however, that PTT or other instant-connect service could be provided in other arrangements as well, whether wireless and/or landline.

Exemplary wireless communication system 50 includes a number of mobile stations, such as mobile stations 52 and 54 for instance. Each mobile station (MS) can be linked by a radio access network with an IP network 56. As shown by way of example, MS 52 is linked by a first radio access network 58 with the IP network, and MS 54 is linked by a second radio access network 60 with the IP network. Alternatively, both MS 52 and MS 54 can be linked with the IP network by a common radio access network. Other alternatives are possible as well.

Each radio access network provides wireless connectivity with the IP network and can take any of a variety of forms. By way of example, radio access network 58 may include a base transceiver station (BTS) 62 that can communicate with MS 52 over an air interface 64. BTS 62 may then be coupled with a base station controller (BSC) 66, which may in turn be coupled with a mobile switching center (MSC) 68 and with a packet data serving node (PDSN) 70 or other gateway to the IP network 56. (At times, a BTS and BSC in combination may be referred to as a "base station.") Similarly, radio access network 60 may include a BTS 72 that can communicate with MS 54 over an air interface 74. BTS 72 may then be coupled with a BSC 76, which may in turn be coupled with an MSC 78 and with a PDSN 80 or other gateway to the IP network 56.

As another example, either or both of the radio access networks could comprise a base station that itself functions as a gateway with the IP network, without use of a PDSN or other gateway to the network. And as another example, MS 52 and MS 54 could communicate at least in part via a common radio access network, such as through a common PDSN, a common BSC and/or a common BTS. Other examples are also possible.

As a general matter, in order for a mobile station such as mobile station 52 or 54 to engage in packet-based media conferencing, it would need to acquire both a radio link layer connection with its radio access network and a data link layer connection with the IP network 56. The manner in which the mobile station acquires these connections might vary depending on the protocol used for communication over the air interface. In the exemplary embodiment, for instance, each air interface may be a code division multiple access (CDMA) air interface, and communications between each mobile station and the radio access network may comply with an industry standard such as cdma2000, which is published by the 3rd Generation Partnership Project 2. However, the air interface could follow other protocols as well, such as TDMA, GSM or 802.11x for instance.

Under cdma2000, to establish a packet-data connection, a mobile station would send a packet-data origination request over a common air interface channel (such as a reverse link access channel) to the MSC and would include in the request a "packet data" service option code that indicates a desire to establish a packet-data connection. In response to the "packet data" service option code, the MSC may then send the request to the BSC for processing.

In turn, the BSC may then establish a radio link layer connection with the mobile station, by directing the mobile station to operate on a particular traffic channel over the air interface (e.g., a fundamental traffic channel, and perhaps one or more supplemental channels). In addition, the BSC may pass the initiation request to the PDSN, and the PDSN and mobile station may then negotiate with each other to establish a data-link layer connection, typically a point-to-point protocol (PPP) session, over which packet data can be communicated between the mobile station and the PDSN. Further, the PDSN may assign a mobile-IP address to the mobile station, which the mobile station can use as its network address for communicating with other entities on the packet-switched network.

In order to conserve air interface resources, the radio-link layer connection with the mobile station may be arranged to time-out after a predefined period of inactivity. For instance, after 10 seconds in which no data is communicated to or from the mobile station over the assigned traffic channel, the BSC might programmatically release the traffic channel, allowing the channel to be used by other mobile stations instead. At the same time, however, the data-link layer (e.g., PPP) connection with the mobile station might remain, so the mobile station may retain its IP address.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

As further shown in FIG. 3, a number of other entities may be coupled with (or may sit as nodes on) IP network 56. These other entities may include a proxy server 82, a communication server 84, and a group data store 86. The proxy server 82 can be a SIP proxy server that functions to receive and forward SIP signaling messages, such as SIP INVITE requests. And the communication server 84 may be a PTT server that functions to establish and carry PTT sessions between MS 52 and MS 54 and/or between other stations (landline or wireless) linked with IP network 56. Group data store 86 may then define groups of subscribers set to communicate with each other.

These entities may be arranged in any of a variety of ways. For example, group data store 86 may reside on a discrete database server that is coupled with the IP network 56 and that is accessible by communication server 84. Or group data store 86 may reside within communication server 84 or proxy server 82. And as another example, the function of proxy server 82 may be integrated with the function of communication server 84. Other examples are also possible.

b. Example Component Architecture

Figure 4:
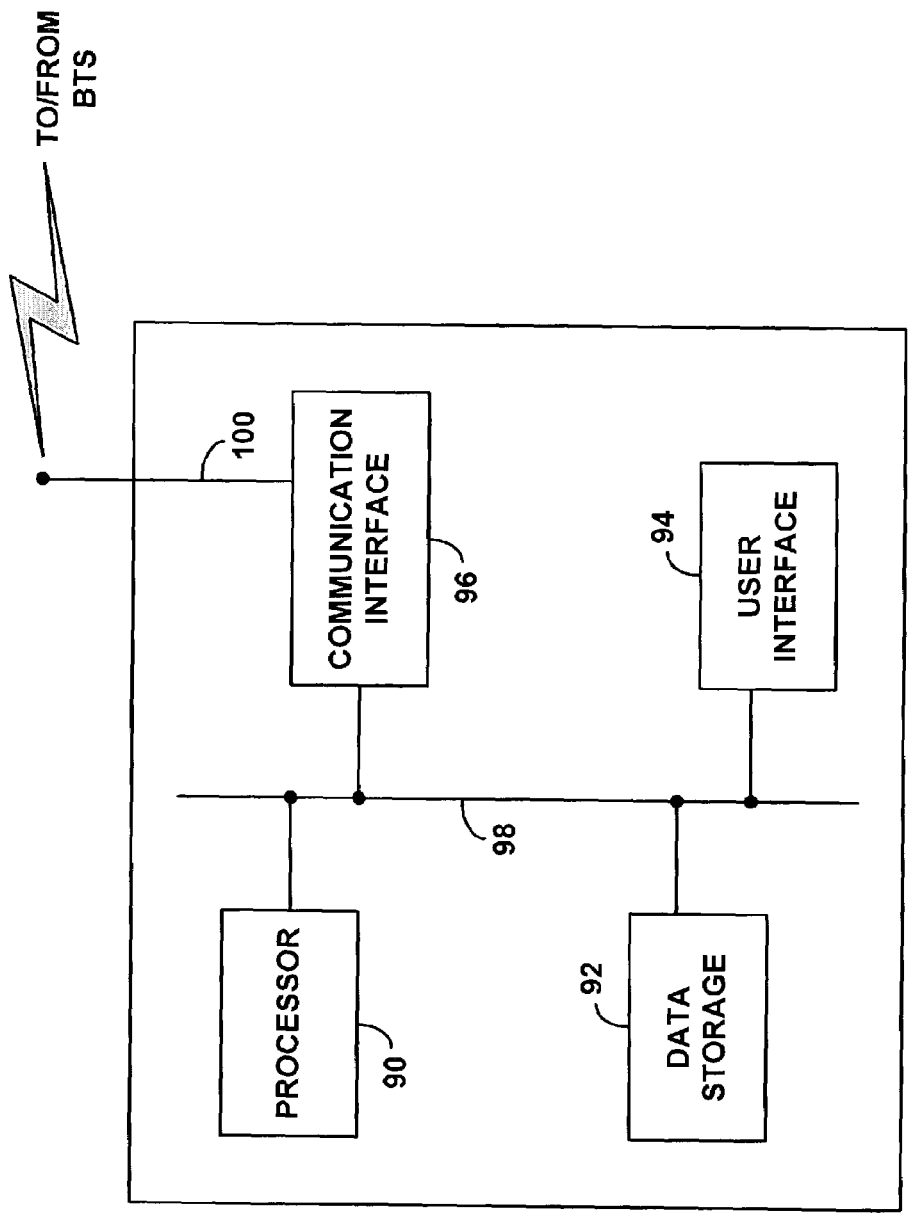
FIG. 4 is a block diagram of a mobile station operable in the arrangement of FIG. 3.

MS 52 and MS 54 may each take various forms and may be the same as or different than each other. To help illustrate, FIG. 4 is a simplified block diagram depicting an exemplary mobile station. As shown in FIG. 4, the exemplary mobile station includes a processor 90, data storage 92, a user interface 94, and a wireless communication interface 96, all of which may be coupled together by a system bus or other mechanism 98.

Each of these components may take various forms, the particular details of which are not necessarily critical. For instance, processor 90 may be general purpose microprocessor (e.g., an Intel Pentium class processor) or a dedicated processor, either of which could integrate part or all of data storage 92. And data storage 92 may be volatile and/or non-volatile storage (such as flash memory and/or a storage drive).

User interface 94 may facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting between analog media signals and digital representations of those signals.)

In addition, the user interface 94 may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. For PTT functionality, the input mechanism may also include a PTT button (not shown) or other mechanism that a user can readily engage in order to initiate PTT communication.

Wireless communication interface 96, in turn, may facilitate communication over an air interface with a respective base station, in compliance with an air interface protocol, such as CDMA, TDMA, GSM or 802.11x for instance. As such, the wireless communication interface may comprise a dedicated chipset (not shown) coupled with an antenna 100 for sending and receiving signals over the air interface.

In the exemplary embodiment, data storage 92 holds a set of logic (e.g. computer instructions) executable by processor 90 to carry out various functions described herein. (Alternatively or additionally, the logic may be embodied in firmware and/or hardware.) Preferably, the logic defines various core functions to facilitate wireless packet-data communication and real-time media conferencing such as PTT communication, as well as supplemental logic to facilitate the enhanced functionality that will be described below.

To facilitate wireless packet data communication, for instance, the logic may function to establish a data connection automatically when the mobile station is powered on, or in response to a user request or a page signal. For instance, the logic may be arranged to generate and send a packet-data origination request into the network as described above, and to receive a traffic channel assignment from a BSC, to establish a PPP session with a PDSN, and to receive an IP address assignment to use for packet-data communications.

To facilitate real-time media conferencing, the logic may be compliant with SIP and RTP as described above with reference to the user stations in FIG. 1. For instance, in response to a user request to initiate a conference (e.g., by pressing the PTT button with the mobile station is not currently involved in a PTT session), the logic may function to send a SIP INVITE (via proxy server 82) to communication server 84, to receive a SIP 200 OK in response from the server, and to then send a SIP ACK to the server. Further, in response to a SIP INVITE from the conference server inviting the mobile station to participate in a conference, the logic may function to send a SIP 200 OK to the server and to then receive from the server a SIP ACK.

Further, the logic may facilitate sending, receiving and playing out of media signals. In this regard, for instance, the logic may function to receive media signals from a media input mechanism and to encode and packetize outgoing media signals as RTP/UDP/IP (or perhaps RTP/TCP/IP) packets for transmission via communication interface 96 and via the radio link and data link to one or more other entities on IP network 56. Similarly, the logic may function to depacketize and decode incoming media signals provided by communication interface 96 and to pass the decoded signals to one or more media output mechanisms for playout to a user.

Still further, the logic preferably facilitates interaction with a user through user interface 94. As such, the logic might define user interface scripts that can cause various data or information to be presented by user interface 54 to a user. Further, the logic may function to receive user input (such as selections made in response to the user interfaces) from user interface 94 and to respond accordingly.

In this regard, the logic might define a core PTT application with which a user can interact in order to select a target user or group with whom the user wants to engage in a PTT session, or in order to carry out other PTT related actions (such as configuring various use settings, for instance). Such an application could conventionally present a user with one or more menus or links through which a user could navigate in order to take certain actions.

For instance, the user might invoke the application and then browse to a menu that presents a list of predefined target users or groups, and the user may select one of the list entries. The user may then press the PTT button on the mobile station in order to initiate a PTT session with the selected user or group. In response, as noted above, the logic could then generate and send a SIP INVITE seeking to set up the requested PTT session.

Each BTS, BSC, MSC, and PDSN shown in FIG. 3 can largely be a conventional component of a radio access network, such as may be provided by Sprint PCS for instance. Therefore, these components are not described here in detail. (As examples, each BTS can be a Motorola SC4812, SC611, SC614 or SC4850, each BSC can be a Nortel BSS or a Motorola CBSC, each MSC can be Lucent 5ESS, and each PDSN can be a Nortel Shasta 5000 or a CommWorks Total Control 1000. Other examples are also possible.)

In turn, proxy server 82, communication server 84 and group data store 86 can also take various forms. For example, proxy server 42 can comprise a SIP proxy server application running on a computer at a defined IP address on network 56. As such, the computer could function strictly as a SIP proxy server, or it could be a more complex platform (e.g., "service agent") that manages all packet-data communications involving mobile stations.

Group data store 86 can hold data reflecting PTT groups and PTT users. For instance, the group data store 86 can include a listing of PTT groups and, for each group, could identify users who are members of the group. Each user could be identified by a SIP address or by another identifier such as a MIN (mobile identification number) of the user's mobile station. Further, the group data store 86 can include data that correlates user/station identifiers with SIP addresses, for use in determining SIP addresses of target users.

Figure 5:
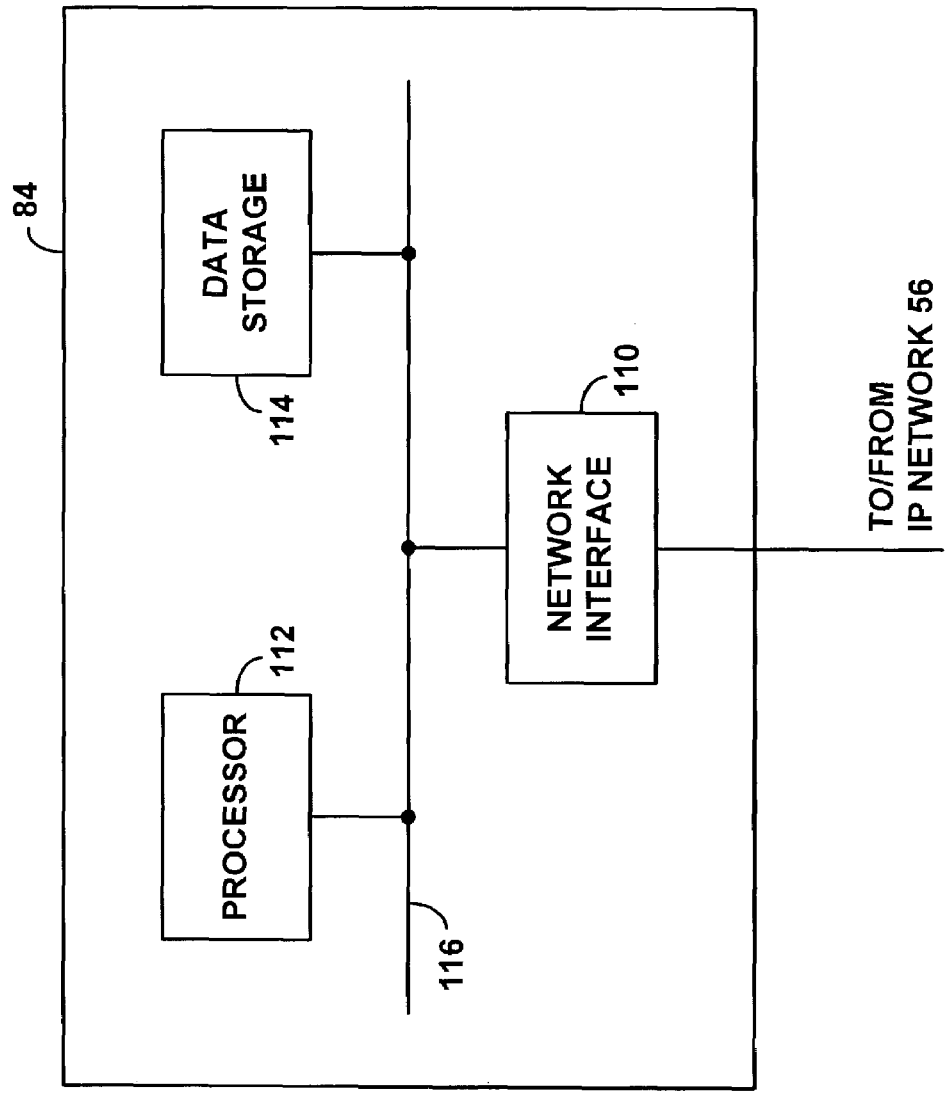
FIG. 5 is a block diagram of a communication server operable in the arrangement of FIG. 3.

Communication server 84, in turn, may comprise a conference server that also sits at a defined address on IP network 56. Referring to FIG. 5, a generalized block diagram of a representative server 84 is shown. As illustrated, exemplary server 84 includes a network interface unit 110, a processor 112, and data storage 114, all tied together via a system bus, network or other mechanism 116.

Network interface unit 110 functions to provide connectivity with IP network 56. As such, network interface unit 110 may receive packets from the IP network and may route packets independently over the IP network to designated IP addresses. A suitable network interface unit is Ethernet card, but other examples are also possible.

Data storage 114 then preferably holds machine language instructions and/or other logic executable by processor 112 to carry out various functions described herein. (Alternatively or additionally, some such functions could be carried out by hardware and/or firmware). As such, the logic may define various functions to facilitate network communication and media conferencing such as PTT communication.

For example, the logic may function to set up, tear down and bridge conference sessions between client stations such as MS 52 and MS 54. As such, the logic could define a SIP client application to engage in signaling with each client station, and an RTP application to facilitate receiving and sending RTP media streams.

Thus, in practice, the logic could operate to receive from an initiating mobile station a SIP INVITE that identifies a target user or group, to query group data store 86 to determine a SIP address of each target user, and to engage in further SIP signaling with the initiating station and with each target user's station so as to set up an RTP conference leg with each user. The logic may then function to bridge those legs together, in order to allow the users to communicate with each other.

3. Sound Mitigation

As noted above, an initiating user station can reduce the impact of latency that occurs during setup of a packet-based real-time media session, by playing out a repetitive tone pattern to the initiating user during the setup period. Advantageously, the initiating station would generate the repetitive tone pattern itself rather than play out a tone pattern that it is receiving from a network entity during the setup period. The initiating station may then stop playing out the repetitive tone pattern once it determines that session setup is complete.

Figure 6:
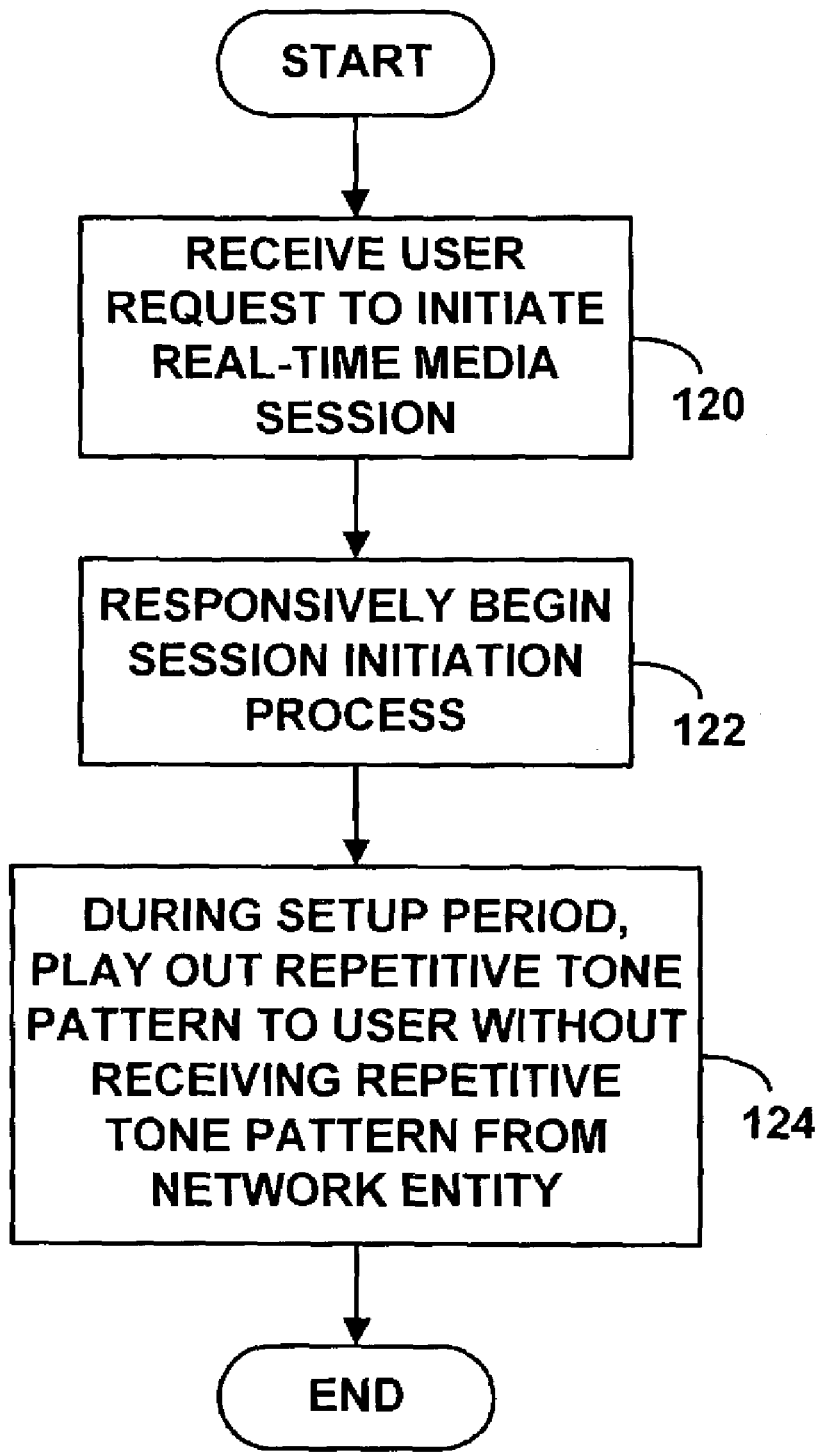
FIG. 6 is a flow chart depicting functions that could be carried out in accordance with the exemplary embodiment.

An example of this process is generally illustrated in FIG. 6. As shown in FIG. 6, at block 120, a station receives a user request to initiate a packet-based real-time media session, such as a PTT session for instance. In response, at block 122, the station begins a session initiation process, which might involve acquiring a data connection and sending a session setup signal such as a SIP INVITE through that connection into the network, for instance. The period of time from when the station receives the user request until the station enters into a real-time communication session, such as a leg of the requested session for instance, will be considered the setup period. At block 124, during that setup period, the station will play out a repetitive tone pattern to the user, without receiving the repetitive tone pattern from a network entity during the setup period.

In the exemplary embodiment, the station will play out the repetitive tone pattern for the entire setup period or for a substantial portion of the setup period. A "substantial portion" would be a portion that is long enough to let the user know that session setup is in progress and could be anywhere from 50% to 100% of the setup period.

By way of example, the station could begin to play out the repetitive tone pattern immediately after the user requests session initiation, and the station could stop playing out the repetitive tone pattern upon determination that it has entered into a communication session, i.e., that the setup period has ended.

And as another example, the station could begin playing out the repetitive tone pattern at some point after the setup period has begun, perhaps in response to a triggering event such as a signal from the network. Referring to FIGS. 1 and 2, an example of such a signal is a SIP 100 TRYING message that proxy server 18 sends to initiating user station 12 after the setup period begins. Using receipt of a 100 TRYING message as a trigger for the initiating station to begin playing a repetitive tone pattern provides an added benefit, in that the initiating station would sensibly not play a repetitive tone pattern if it does not establish a data connection (and therefore does not receive the 100 TRYING message).

(Once the session period has ended and/or when a determination is made that the user of the initiating station can begin speaking or otherwise providing media, the station can play a message to the user such as "you have the floor" to alert the user that communication can begin. This would be akin to a person at the other end of a phone call saying "hello.")

In the exemplary embodiment, the repetitive tone pattern would be predefined in the initiating station. For instance, it could be stored as a WAV or MP3 file in data storage in the user station, or program logic in the user station could be written to specifically define the repetitive tone pattern. It is also possible that custom repetitive tone patterns could be downloaded or otherwise installed into the user station and set to be played out to a user when the station is engaged in session setup.

The repetitive tone pattern itself can take various forms. In a preferred embodiment, however, the tone pattern will preferably be of a nature that tends to relax the user. Experimentation has shown good results occur with a sound that alternates between periods of silence and an amplitude-modulated articulation of a C major triad positioned at C3, with modulation at a rate of 4 per second. In particular, good results occur when the modulations last for about 2.5 seconds and the periods of silence last about 3.5 seconds. Each modulation can have slightly different attack characteristics (e.g., due to human instrumental technique), which could make the sound more relaxing for the user and could help mitigate the perceived delay in session setup.

The user station that carries out this function can generally any type of user station that is able to initiate a packet-based real-time media session, whether landline or wireless. A good example of this is a mobile station such as MS 52 as shown in FIG. 3. Further, the station can be a PTT-capable mobile station as described above and as illustrated in FIG. 4, or could be another sort of PTT-capable station.

To carry out this sound mitigation process in a mobile station as shown in FIG. 4, for instance, data storage 92 can contain an audio file that is a digitized version of the repetitive tone pattern. Further, data storage 92 can include supplemental program logic executable by processor 90 to play out the repetitive tone pattern during the setup period. That is, after the mobile station receives a session initiation request from a user, the logic could function to retrieve and play out the repetitive tone pattern. Further, the logic could then function to stop playing out the repetitive tone pattern in response to a determination that the setup period has ended.

Figure 7:
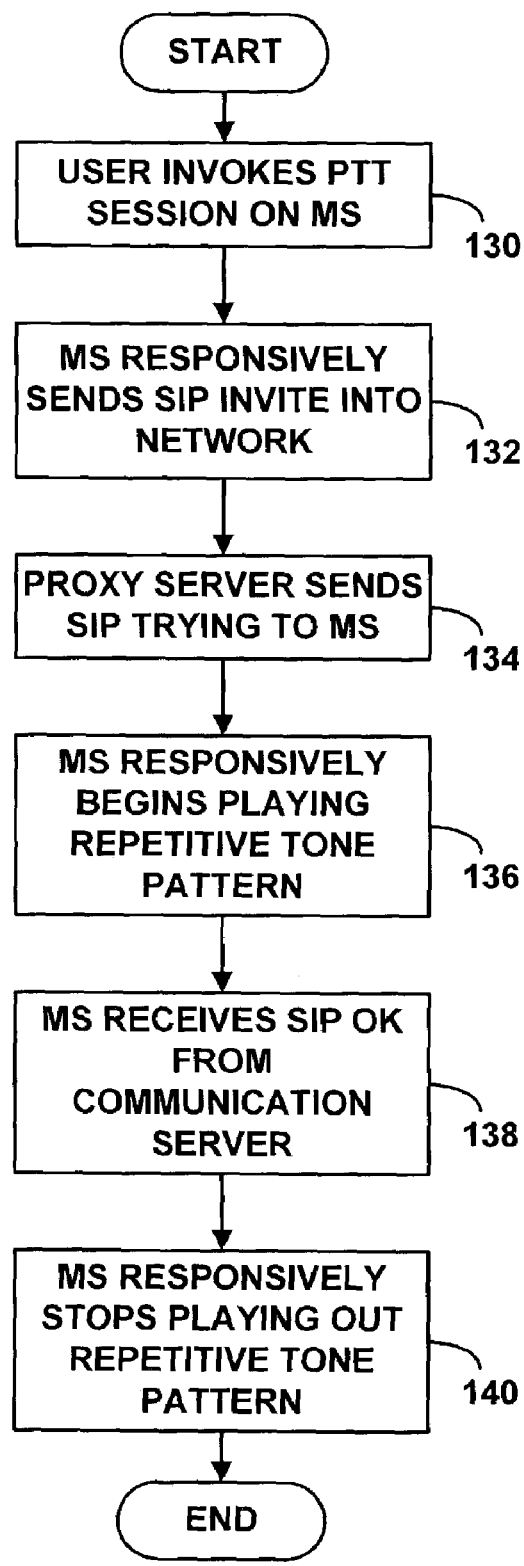
FIG. 7 is another flow chart depicting functions that could be carried out in accordance with the exemplary embodiment.

Referring next to FIG. 7, a more specific flow chart is now shown, to further illustrate how the sound mitigation process could be carried out in an exemplary PTT system, within the wireless communication system shown in FIG. 3. This example assumes that MS 52 is the initiating station. Further, the example assumes that MS 52 will be arranged to begin generating a repetitive tone pattern when MS 52 receives a 100 TRYING from the network, confirming that setup signaling is in process.

As shown in FIG. 7, at block 130, an initiating user invokes a PTT session, such as by pressing a PTT button on MS 52. At block 132, MS 52 responsively sends a SIP INVITE message to proxy server 82, for transmission in turn to communication server 84. At block 134, the proxy server then sends a 100 TRYING message to MS 52, to indicate that signaling is in process.

At block 136, in response to receipt of the 100 TRYING message, MS 52 begins playing out a repetitive tone pattern to the user. For instance, MS 52 may automatically load a WAV file of the tone pattern from data storage 92 and play out the file via user interface 94 for the user to hear.

At block 138, MS 52 thereafter receives a SIP 200 OK message from communication server 84, agreeing to establish an RTP conference leg with MS 52, after which MS 52 would respond with a SIP ACK message to complete signaling. Given that MS 52 has thus entered into a communication session with server 84, at block 140, MS 52 then stops playing out the repetitive tone pattern.

4. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. In a mobile station having a user interface, wherein the user interface includes a microphone for receiving speech signals from a user, a speaker for playing out speech signals to the user, an output mechanism for presenting information to a user, and an input mechanism for receiving input from the user, wherein the input mechanism includes a push-to-talk (PTT) mechanism engageable by the user to invoke a PTT session as a packet based real time media session via a radio access network serving the mobile station, a method comprising:

receiving, by user engaging of the PTT button, a user request to initiate a PTT session;

responsive to the user request, beginning a session initiation process comprising sending a Session Initiation Protocol (SIP) INVITE message via a wireless packet data connection, seeking initiation of the PTT session, wherein a period of time from when the mobile station receives the user request until the PTT session is set up defines a setup period; and during the setup period, playing out to the user, via the user interface, a ring sound to indicate to the user that the PTT session is being set up, wherein when the mobile station is playing out the ring sound, the mobile station is not receiving the ring sound from another entity but is rather generating the ring sound itself.

2. The method of claim 1, wherein playing out the ring sound to the user during the setup period comprises playing out the ring sound to the user for all of the setup period.

3. The method of claim 1, wherein playing out the ring sound to the user during the setup period comprises playing out the ring sound to the user for a substantial portion of the setup period.

4. The method of claim 1, wherein playing out the ring sound to the user during the setup period comprises:

beginning to play out the ring sound to the user right after receiving the user request; and stopping playout of the ring sound upon determination that the PTT session is set up.

5. The method of claim 1, further comprising beginning to play out the ring sound to the user upon receipt of a SIP TRYING message sent in response to the SIP INVITE message.

6. The method of claim 1, wherein playing out the ring sound to the user during the setup period further comprises:

stopping playout of the ring sound to the user upon receipt of a SIP 200 OK message indicating that the PTT session has been established.

7. The method of claim 1, further comprising:

before receiving the user request, storing a representation of the ring sound in data storage of the client station, wherein playing out the ring sound to the user comprises retrieving and playing out the stored representation.

8. The method of claim 7, wherein the stored representation of the ring sound is a digitized version of the ring sound.

9. The method of claim 1, wherein the mobile station is a cellular mobile station.

10. A mobile station comprising:

a wireless communication interface for engaging in wireless communication with a radio access network;

a processor;

data storage;

ring sound data representing a ring sound, stored in the data storage;

a user interface includes a microphone for receiving speech signals from a user, a speaker for playing out speech signals to the user, an output mechanism for presenting information to a user, and an input mechanism for receiving input from the user, wherein the input mechanism includes a push-to-talk (PTT) mechanism engageable by the user to invoke a PTT session as a packet based real time media session via the radio access network; and program instructions stored in the data storage and executable by the processor to carry out functions comprising:

(a) receiving, by user engaging of the PTT button, a user request to initiate a PTT session, (b) responsive to the user request, beginning a session initiation process comprising sending a Session Initiation Protocol (SIP) INVITE message via a wireless packet data connection, seeking initiation of the PTT session, wherein a period of time from when the mobile station receives the user request until the PTT session is set up defines a setup period, and (c) during the setup period, playing out to the user, via the user interface, a ring sound to indicate to the user that the PTT session is being set up, wherein during playout of the ring sound to the user, the mobile station is not receiving the ring sound from another entity but rather generates the ring sound itself.

11. The mobile station of claim 10, wherein the program instructions are executable to play out the ring sound to the user for all of the setup period.

12. The mobile station of claim 10, wherein the program instructions are executable to play out the ring sound to the user for a substantial portion of the setup period.

13. The mobile station of claim 10, wherein the program instructions are executable to begin playing out the ring sound to the user right after receiving the user request and to stop playing out the ring sound to the user upon determination that the PTT session is set up.

14. The mobile station of claim 10, wherein the program instructions are executable to begin playing out the ring sound to the user upon receipt of a SIP TRYING message sent in response to the SIP INVITE message.

15. The mobile station of claim 10, wherein the program instructions are executable to stop playing out the ring sound to the user upon receipt of a SIP 200 OK message indicating that the PTT session has been established.

16. The mobile station of claim 10, wherein the data storage contains a representation of the ring sound before the cellular mobile station receives the user request, wherein the program instructions are executable to play out the ring sound to the user by retrieving and playing out the stored representation.

17. The mobile station of claim 16, wherein the stored representation of the ring sound is a digitized version of the ring sound.

18. The mobile station of claim 10, wherein the mobile station comprises a cellular mobile station.

* * * * *